(12) United States Patent
Bidner et al.

(10) Patent No.: US 10,816,644 B2
(45) Date of Patent: Oct. 27, 2020

(54) MODULATED INFRARED LIGHTING

(71) Applicant: Ford Global Technologies, LLC, Dearborn, MI (US)

(72) Inventors: David Karl Bidner, Livonia, MI (US); Timothy Joseph Clark, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 207 days.

(21) Appl. No.: 15/481,756

(22) Filed: Apr. 7, 2017

(65) Prior Publication Data

US 2018/0292513 A1 Oct. 11, 2018

(51) Int. Cl.

| G01S 7/48 | (2006.01) |
|---|---|
| G08G 1/0965 | (2006.01) |
| H04B 10/114 | (2013.01) |
| G01S 17/931 | (2020.01) |
| G01S 7/02 | (2006.01) |
| G01S 7/4915 | (2020.01) |
| G01S 17/08 | (2006.01) |
| G01S 17/42 | (2006.01) |

(Continued)

(52) U.S. Cl.
CPC ............ *G01S 7/4808* (2013.01); *G01S 7/022* (2013.01); *G01S 7/4806* (2013.01); *G01S 7/4915* (2013.01); *G01S 17/08* (2013.01); *G01S 17/42* (2013.01); *G01S 17/58* (2013.01); *G01S 17/931* (2020.01); *G08G 1/0965* (2013.01); *H04B 10/1143* (2013.01); *H04N 5/332* (2013.01); *B60K 2031/0033* (2013.01); *G01S 13/865* (2013.01); *G01S 13/867* (2013.01); *G01S 13/931* (2013.01); *G01S 2013/9316* (2020.01); *G01S 2013/9323* (2020.01); *G01S 2013/9324* (2020.01); *G01S 2013/93271* (2020.01); *G01S 2013/93275* (2020.01); *G08G 1/161* (2013.01)

(58) Field of Classification Search
CPC .................................................... G01S 7/4808
See application file for complete search history.

(56) References Cited

U.S. PATENT DOCUMENTS

| 7,961,086 B2 | 6/2011 | Bradley |
|---|---|---|
| 8,868,141 B2 | 10/2014 | Subramanian et al. |

(Continued)

FOREIGN PATENT DOCUMENTS

| JP | 3997403 B2 | 8/2007 |
|---|---|---|
| JP | 2014016973 A | 1/2014 |
| JP | 2016181295 A | 10/2016 |

OTHER PUBLICATIONS

Nguyen, Trang, et al., "Asynchronous Scheme for Optical Camera Communication-Based Infrastructure-to-Vehicle Communication," International Journal of Distributed Sensor Networks, vol. 2015, Article ID 908139; Sep. 27, 2014; 11 pages.

(Continued)

*Primary Examiner* — Imran K Mustafa
(74) *Attorney, Agent, or Firm* — Frank A. MacKenzie; Bejin Bieneman PLC

(57) ABSTRACT

A computing device in a vehicle can emit a sequence of light pulses having a first speed, then receive a signal from another vehicle. Following this, the computing device can emit a message as a sequence of light pulses having a second speed based on the signal received from the vehicle, wherein the first speed is different from the second speed.

20 Claims, 7 Drawing Sheets

(51) Int. Cl.
*G01S 17/58* (2006.01)
*H04N 5/33* (2006.01)
*G01S 13/86* (2006.01)
*G08G 1/16* (2006.01)
*G01S 13/931* (2020.01)
*B60K 31/00* (2006.01)

(56) References Cited

U.S. PATENT DOCUMENTS

| | | | |
|---|---|---|---|
| 2003/0231105 A1* | 12/2003 | Kim | G06K 7/0008 |
| | | | 340/10.2 |
| 2005/0220040 A1 | 10/2005 | Petrovic et al. | |
| 2006/0263086 A1 | 11/2006 | Damink | |
| 2010/0205321 A1 | 8/2010 | Martinez Bauza et al. | |
| 2013/0127638 A1 | 5/2013 | Harrison | |
| 2015/0327028 A1* | 11/2015 | Zhang | H04W 4/12 |
| | | | 455/452.1 |

OTHER PUBLICATIONS

Search Report from United Kingdom Intellectual Property Office dated Oct. 8, 2018 regarding Application No. GB1805771.1 (4 pages).

* cited by examiner

MODULATED INFRARED LIGHTING

BACKGROUND

Vehicles can be equipped to operate in both autonomous and occupant piloted mode. Vehicles can be equipped with computing devices, networks, sensors and controllers to acquire information regarding the vehicle's environment and to pilot the vehicle based on the information. A computing device can also be equipped with computing devices, networks, sensors and controllers to acquire information regarding the vehicle's occupants and to pilot the vehicle based on the information.

Vehicles can also be equipped with network interfaces to permit communications between computing devices in vehicles and computing devices in other vehicles and between computing devices in vehicles and infrastructure computing devices via networks including BLUETOOTH®, wi-fi, and cellular phone networks, etc. Vehicles can send and receive messages related to traffic safety via network interfaces to and from other vehicles and infrastructure computing devices.

DETAILED DESCRIPTION

Figure 1:
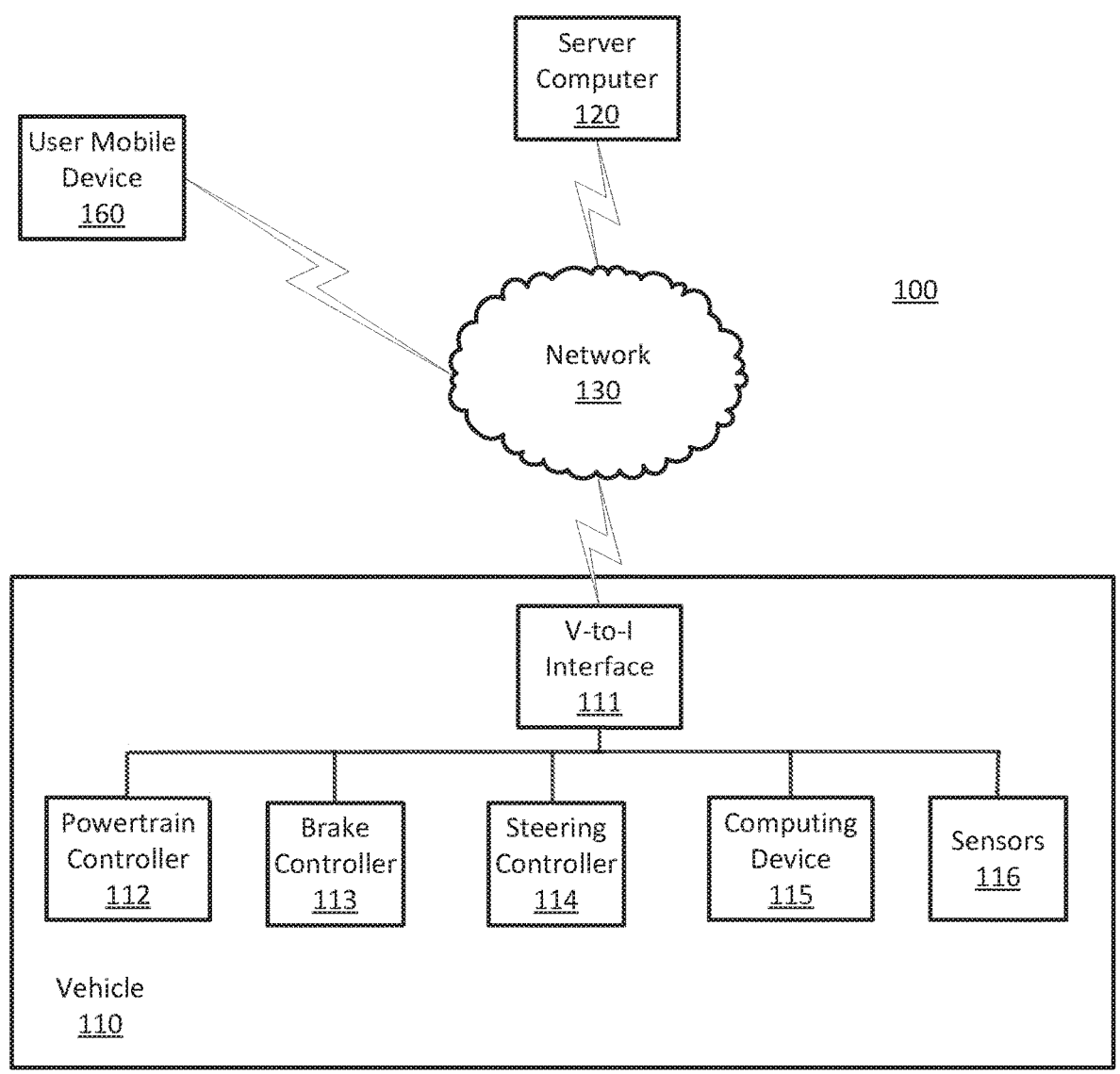
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real world including features such as roads. Vehicles can be piloted and maps can be determined based on locating and identifying road signs in the surrounding real world. By piloting we mean directing the movements of a vehicle so as to move the vehicle along a roadway or other portion of a path.

Disclosed is a method, comprising transmitting a sequence of light pulses having a first speed, receiving a second sequence of light pulses from a vehicle, and, transmitting a message as a sequence of light pulses having a second speed based on the second sequence of light pulses received from the vehicle, wherein the first speed is different from the second speed. A computing device can determine the second speed based on the second sequence of light pulses received from the vehicle that is slower than the first speed. The computing device can determine when the vehicle is no longer in proximity and can transmit a sequence of light pulses having a third speed, wherein the third speed is faster than the second speed. The computing device can receive a third sequence of light pulses from a third vehicle and transmits the message as a sequence of light pulses having a third speed based on the third sequence of light pulses received from the vehicle, wherein the third speed is different from the second speed. The light pulses can be modulated IR radiation.

The message can include information regarding vehicle position, motion, size, safety events, path history and vehicle status, encoded into light pulses as binary bits, wherein the encoding is independent of message transmission speed. The message can also be transmitted via a wireless vehicle-to-vehicle network. The sequences of light pulses can be received via an IR video sensor and the sequences of light pulses can be received from two or more vehicles, wherein emitting the message as a sequence of light pulses having a fourth speed can be based on the sequences of light pulses, wherein the fourth speed is set equal to the slowest of the sequences of light pulses.

The first speed can be indicated by a preamble including a "101010" bit pattern and the message can be encoded using pulse width modulation. The message can include a basic safety message and the frame rate of the IR video sensor can be increased by sub-sampling.

Further disclosed is a computer readable medium storing program instructions for executing some or all of the above method steps. Further disclosed is a computer programmed for executing some or all of the above method steps, including a computer apparatus, programmed to transmit a sequence of light pulses having a first speed receive a second sequence of light pulses from a vehicle, and, transmit a message as a sequence of light pulses having a second speed based on the second sequence of light pulses received from the vehicle, wherein the first speed is different from the second speed. A computing device can determine the second speed based on the second sequence of light pulses received from the vehicle that is slower than the first speed. The computing device can determine when the vehicle is no longer in proximity and transmits a sequence of light pulses having a third speed, wherein the third speed is faster than the second speed.

The computing device can receive a third sequence of light pulses from a third vehicle and transmits the message as a sequence of light pulses having a third speed based on the third sequence of light pulses received from the vehicle, wherein the third speed is different from the second speed. The light pulses are modulated IR radiation and the message can include information regarding vehicle position, motion, size, safety events, path history and vehicle status, encoded into light pulses as binary bits, wherein the encoding is independent of message transmission speed. The message can also be transmitted via a wireless vehicle-to-vehicle network. The sequences of light pulses can be received via an IR video sensor and the sequences of light pulse can be received from one or more vehicles, wherein emitting the message as a sequence of light pulses having a fourth speed is based on the sequences of light pulses, wherein the fourth speed is set equal to the slowest.

FIG. 1 is a diagram of a vehicle information system 100 that includes a vehicle 110 operable in autonomous ("autonomous" by itself in this disclosure means "fully autonomous") and occupant piloted (also referred to as nonautonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Computing device 115 in vehicle 110 can communicate with computing devices 115 in other vehicles 110 via vehicle-to-vehicle (V-to-V) networking using V-to-I interface 110. V-to-V networking can permit communication with other vehicles via infrastructure-supported networks, or directly with other vehicles via ad hoc networks created spontaneously with nearby vehicles based on signal strength, for example. V-to-V networks can be used to communicate basic safety messages between vehicles 110 and thereby assist computing device 115 in determining safe operation of vehicle 110 by transmitting information on the location and motion of vehicle 110 and receiving information on the location and motion of nearby vehicles. V-to-V networks based on 5.9 GHz frequency bands can be limited to 300 meters range and subject to blackouts due to null regions caused by destructive interference of multiple paths of reflected radio waves, for example. Communicating basic safety messages via modulated infrared (IR) light can provide redundancy to radio wave-based V-to-V communication and thereby increase vehicle 110 safety.

A basic safety message (BSM) is a message for transmission between vehicles via a V-to-V networking and between vehicles and infrastructure computing devices that includes a predetermined set of parameters that can describe the position, motion, and size of a vehicle, for example. BSM contents and transmission are described in SAE standards J2945/1 and J2735, published by the Society of Automotive Engineers, Warrendale, Pa., USA 15096. Table 1 is a description of parameters included in BSM Part 1.

TABLE 1

Basic Safety Message, Part I
Part I

| Data Frame (DF) | Data Element (DE) |
|---|---|
| Position (DF) | |
| | Latitude |
| | Elevation |
| | Longitude |
| | Positional accuracy |
| Motion (DF) | |
| | Transmission state |
| | Speed |
| | Steering wheel angle |
| | Heading |
| | Longitudinal acceleration |
| | Vertical acceleration |
| | Lateral acceleration |
| | Yaw rate |
| | Brake applied status |
| | Traction control state |
| | Stability control status |
| | Auxiliary brake status |
| | Brake applied boost |
| Vehicle size (DF) | |
| | Vehicle width |
| | Vehicle length |

Basic Safety Message, Part I includes information regarding the position, motion and size of a vehicle 110. This information can be used by other computing devices 115 in other vehicles 110 and infrastructure computing devices to determine predicted paths for vehicles and thereby pilot vehicles and control traffic to prevent impacts between vehicles and promote safe and efficient traffic flow, for example. A BSM can encoded as binary characters, grouped into packets identified by headers and protected by checksums to permit computing device 115 to reliably communicate messages including a BSM.

It is possible to communicate between computing devices 115 in vehicles 110 and computing devices in traffic control infrastructure such as traffic lights via color video cameras and visible light emitting diodes (LEDs) installed on the traffic signals and color video cameras and LEDs installed in vehicles to transmit messages. This technology operates in visible wavelengths and is limited to V-to-I networks. FIGS. 2-8 include examples of IR LEDs and IR video technology used to permit vehicle 110 to communicate a BSM with other vehicles by modulated IR lighting. In addition to communicating BSMs with other vehicles via radio frequency V-to-V networks, a vehicle 110 can communicate BSMs with other vehicles via modulated infrared (IR) light emitting diodes (LEDs) and IR video cameras to provide a redundant channel to communicate safety information between vehicles.

Receiving BSMs at a computing device 115 includes receiving a stream of modulated IR radiation representing bits of a digital message including the BSM parameters listed in Table 1 via an IR video sensor such as an IR video camera. Modulated IR radiation representing bits of a digital message can also be received via an IR sensor having higher sensitivity and higher bit rates than IR video sensors, however IR sensors lack the XY spatial output of IR video sensors that can be used to discern modulated IR radiation from multiple vehicles as will be discussed later in relation to FIG. 6.

Digital bit rate achievable via an IR video sensor, unless spatial patterns are included, is limited to ½ the frame rate. A high definition (HD) IR video frame rate can be 60 frames per second (fps), making the highest possible bit rate for a single pixel in the IR video frame 30 bits per second (bps) due to Nyquist sampling limits. Multiple pixels in the frame can be sampled together to form a single bit at this rate, for example. A BSM can include hundreds of bits, for example. At 30 bps, a BSM could take over a minute to receive at IR video frame rates. One solution is to employ high frame rate IR video cameras.

High frame rate IR video cameras can increase the bit rate at which an IR video camera can receive messages, since high frame rate IR video cameras can operate at up to hundreds of frames per second, however, high frame rate IR video cameras can be much more expensive than HD frame rate IR video cameras. In addition, IR frame rates are limited by the number of IR photons available to the sensor per frame and the signal-to-noise ratio of the sensor. Increasing frame rate decreases the amount of time available for each frame to integrate photon energy impinging upon the sensor and convert it to charge. Thus, high frame rate IR video cameras have upper limits on frame rates achievable in practice.

Figure 2:
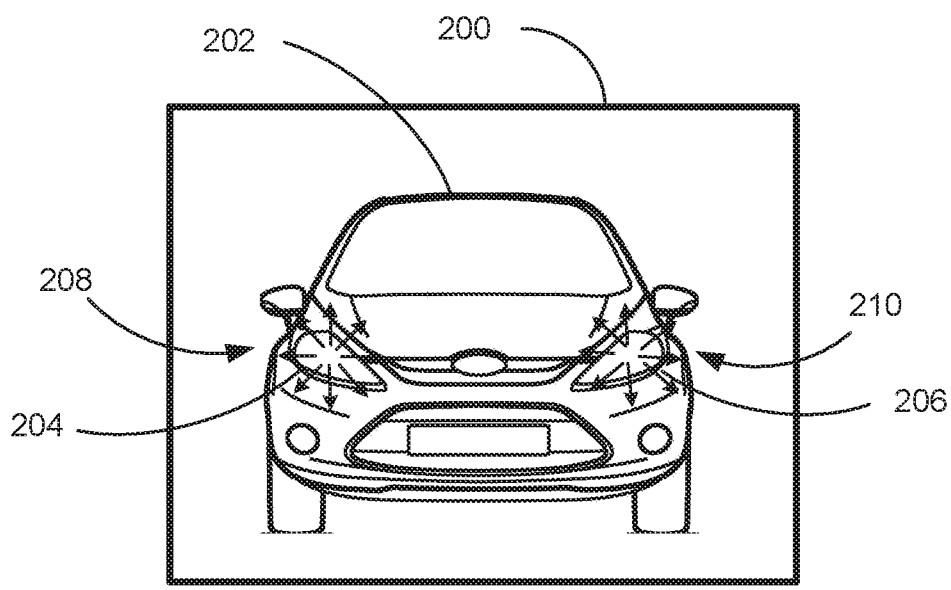
FIG. 2 is a diagram of an example IR video frame.

FIG. 2 is a diagram of a technique to increase IR video frame rates to permit timely reception of BSM without the expense associated with high frame rate IR video cameras. FIG. 2 shows an IR video frame 200 that includes an image of a vehicle 202 including IR radiation 208, 210 from IR LEDs 204, 206, incorporated into headlights of vehicle 202, for example. IR video frame 200 can have width and height dimensions w=1920, h=1040 in pixels, for example. IR video frame 200 is constructed using complementary metal-oxide semiconductor (CMOS) technology. IR video frames 200 constructed using CMOS can address the sensor array according to the XY address of the pixel in the sensor array. This permits reading out only rectangular subsets of the sensor array instead of the entire array in an efficient fashion, and, since the pixel rate can be constant, reading out a subset of the sensor array permits higher effective frame rates due to the limited number of pixels transferred per frame.

Figure 3:
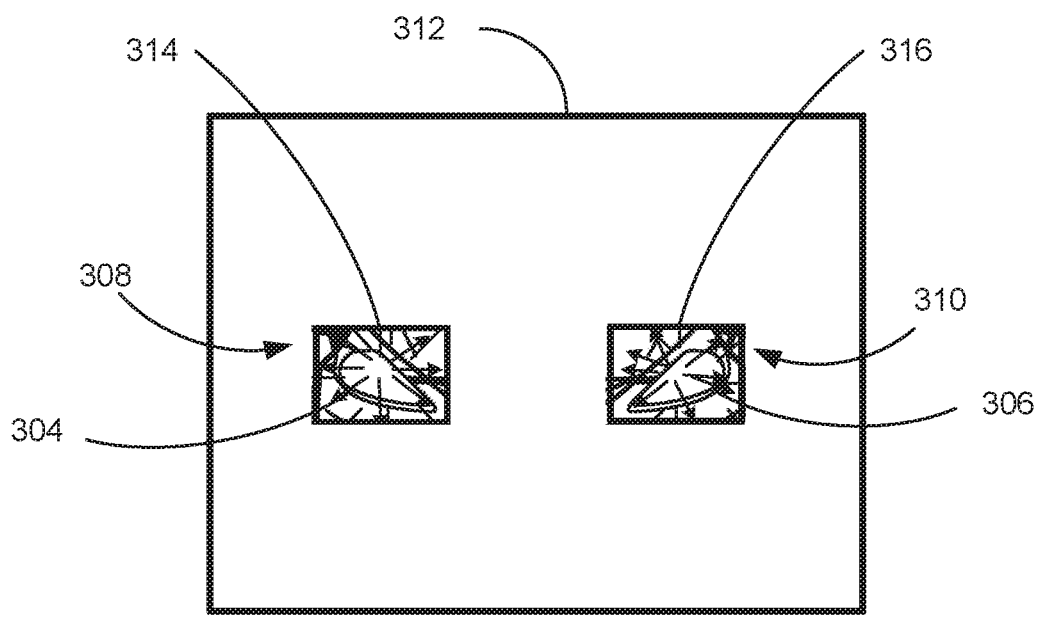
FIG. 3 is a diagram of an example IR video frame.

FIG. 3 shows an IR video frame 212 with two regions of interest (ROIs) 314, 316 formed from video frame 300 that include IR LEDs 304, 306, and therefore IR radiation 308, 310 emitted from IR LEDs 304, 306. ROIs 314, 316 have width and height dimensions r=128, p=128. Because IR video cameras can be constructed to subsample rectangular subsets of the full IR video frame making the amount of time required to read the subsets proportional to the number of pixels read, reading subsets of the full IR video frame can increase frame rates proportionally to the reduction in numbers of pixels read, minus fixed overhead per frame, by the equation:

$$fps_{rp} \propto fps \frac{w*h}{2(r*p)} \quad (1)$$

In this example, decreasing the number of pixels from n*m to 2(r*p) can increase the frame rate $fps_{rp}$ and therefore the bit rate from 30 bps up to 180 bps, which can reduce the amount of time required to transmit a BSM from over a minute to a few seconds, making IR communication of BSMs between vehicles practical.

Increasing frame rates by subsampling IR frames can reach the same photon limits as high frame rate IR sensors, where the integration time for the IR sensor accumulating IR photons between frames becomes so small that the probability of photon events in the sensor becomes low enough to decrease the signal-to-noise ratio to unacceptably low levels. IR LEDs in vehicles 110 can be designed to emit an appropriate photon flux over the designed viewing angles and range to IR video cameras to be reliably detected at the designed frame rate under normal viewing conditions in order to reliably transmit IR data bits. IR emitting LEDs in vehicles 110 can also be designed to provide reliable transmission of data bits under less than perfect conditions by slowing the bit rate of data bits transmitted via IR LED radiation to improve the signal-to-noise ratio of received data bits at IR video cameras without changing the sample rate of the IR video sensor.

IR video sensors can receive IR data bits in modulated IR radiation at bit rates slower than the frame rate by summing or averaging frames over time to reduce the sample rate to match the bit rate of the IR LEDs. ROIs 314, 316 can be formed using known machine vision techniques to locate, track, extract and quantify IR radiation 308, 310 in IR video frame 312. The process of locating, tracking, extracting and quantifying multiple sources of IR radiation in an IR video frame 312 can introduce a delay and thereby limit the bit rate for receiving IR data bits via modulated IR radiation.

Figure 4:
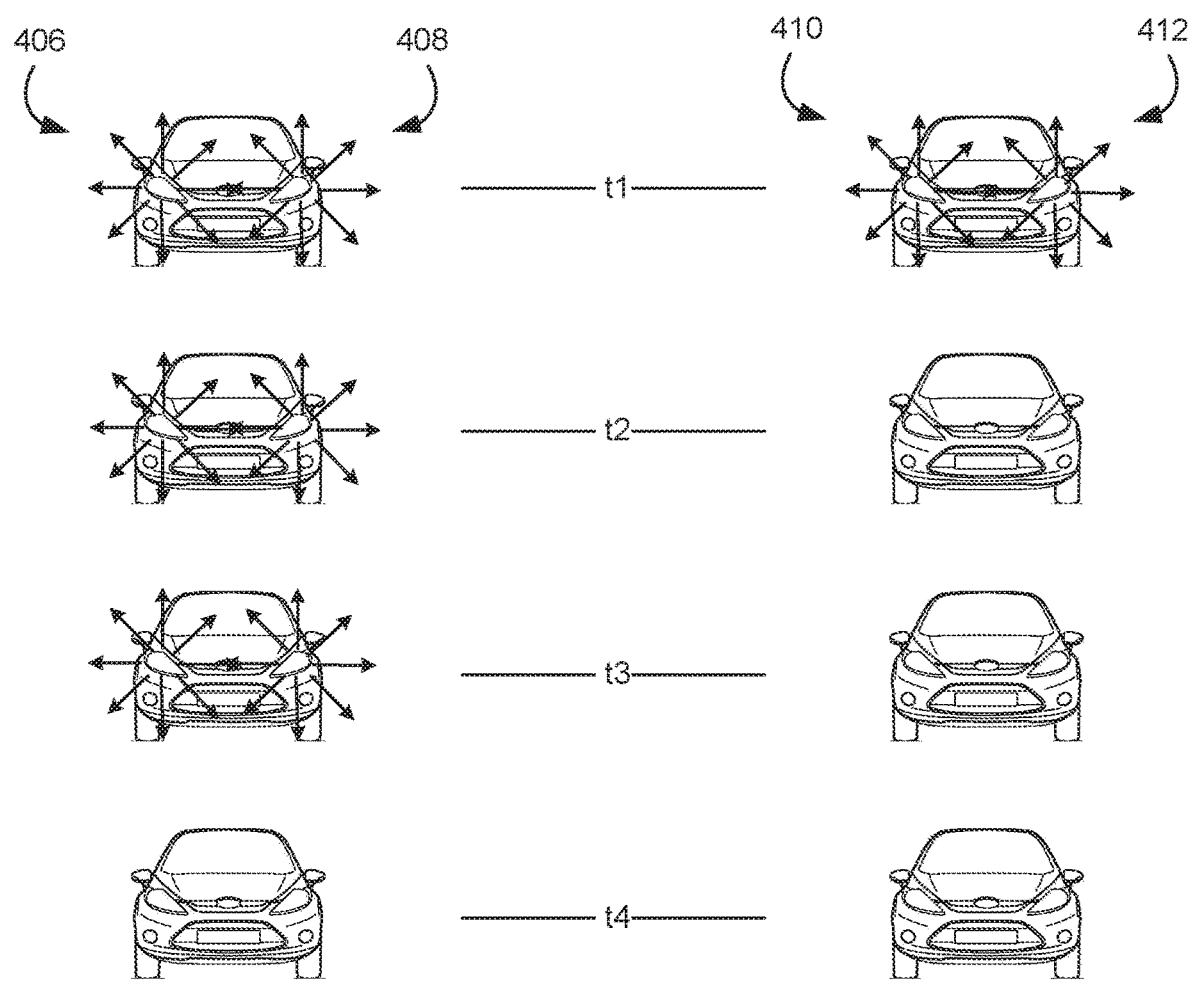
FIG. 4 is a diagram of an example modulated IR lighting.

FIG. 4 is a diagram of IR lighting modulated to provide transmission of data bits at varying speeds. In the context of this disclosure, the "speed" of a data transmission via light pulses is defined as the number of bits per second transmitted, where a bit is defined as a digital "1" or digital "0" to differentiate it from the number of light pulses transmitted. A single digital 1 or 0 can require more than one light pulse to transmit using pulse width modulation (PWM). The IR lighting can be modulated using PWM that effectively varies the width of emitted IR light pulses to form the 1's and 0's of binary bits. As discussed above, the fastest frame rate is the frame rate at which a single bit emitted from IR LEDs at predetermined intensity, size and distance from an IR video sensor under predetermined environmental conditions can be detected with acceptable reliability. Acceptable reliability can be defined as having a 99.9% probability of true positive detection of a single bit emitted from an IR LED, for example. PWM can increase the reliability with which IR video sensors detect bits by encoding 1's and 0's as different pulse widths, thereby using multiple frames to encode each bit.

First column of vehicle 402, 404 images shows a vehicle 402 at time steps t1 through 16. Each time step can correspond to one or more IR video frames. At time step t1, vehicle 402 has energized IR LEDs included in vehicle 402 headlights to emit IR radiation 406, 408 (arrows). At time steps t3 and t4, vehicle 402 IR LEDs are emitting IR radiation. At time step t5, vehicle 402 IR LEDs are not emitting IR radiation. This sequence of three "on" time steps followed by one "off" time step is the PWM encoding for a "1" bit. At time step t1, vehicle 404 has energized IR LEDs to emit IR radiation 410, 412. At time steps t2, t3 and t4, vehicle 404 has not energized IR LEDs. This sequence of one "on" step followed by three "off" steps is the PWM encoding for a "0" bit.

By encoding a 1 as three "on" time steps followed by an "off" time step and encoding a 0 as one "on" time step followed by three "off" time steps, redundancy is gained and reliability improved at the cost of requiring 4 time steps to communicate one bit. In the example in FIG. 3, a 1-bit is identified by a 3:1 ratio of "on" to "off" time periods, while a 0-bit is identified by a 1:3 ratio of "on" to "off" time periods. This is yields a 9:1 ratio between 1-bit and a 0-bit codes, which provides reliable detection. Another advantage of PWM is that since distinguishing 1's from 0's in PWM includes determining the ratio of "on" to "off" time rather than an absolute value, the bit rate can be slowed down without changing the frame rate by simply increasing the number of "on" time steps and the number of "off" time steps to maintain similar ratios of "on" to "off" periods. The receiver can be programmed to determine ratios of "on" to "off" periods to determine 1's and 0's regardless of absolute number of time periods. PWM data transmission is robust, reliable and can be sped up and slowed down without changing the sample rate of the IR video sensor.

Figure 5:
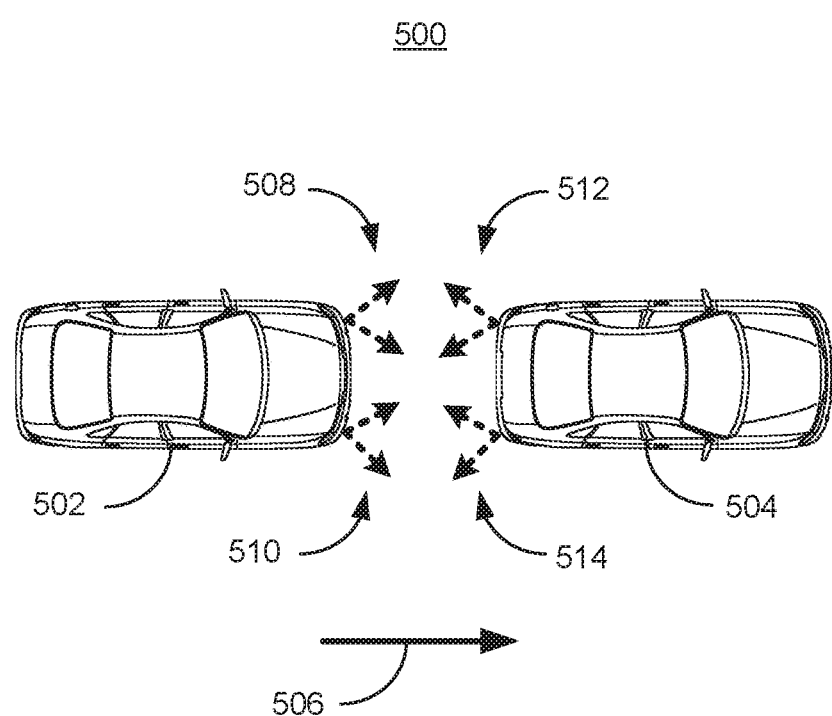
FIG. 5 is a diagram of an example traffic scene.

FIG. 5 is a diagram of a traffic scene 500 with two vehicles 502, 504, moving in traffic in a direction shown by arrow 506. Vehicle 502 includes IR LEDs that can be energized via controllers at the direction of a computing device 115 in vehicle 502 to emit modulated IR radiation 508, 510, 512, 514 that can be received by IR video sensors in communication with a computing device 115 in vehicle 504. Using encoding technology to encode binary data as pulses of radiation from IR LEDs, computing device 115 in vehicle 502 can use IR radiation 508, 510 communicate with computing device 115 in vehicle 504 via IR video cameras in vehicle 504. Computing device 115 can transmit a BSM to vehicle 504 via IR radiation 508, 510 and IR video sensors in vehicle 504, and receive a BSM from computing device 115 in vehicle 504 via IR radiation 512, 514 and IR video sensors in vehicle 502.

Reception of a BSM by vehicles 502, 504 depends upon the bit rate at which respective IR video sensors are able to reliably receive IR bits. For a given intensity and distribution of IR radiation 508, 510, 512, 514, the ability of an IR video sensor to reliably detect a single bit can be a function of optical factors such as distance, angle, f-stop and focus and environmental factors such as solar glare, reflections, precipitation, fog, spray and ice, etc. All these factors can combine to decrease the ability of an IR video sensor to detect data bits transmitted by modulated IR radiation 508, 510, 512, 514.

To permit vehicles 502, 504 to communicate a BSM in spite of optical and environmental factors, techniques discussed herein can negotiate bit rate (speed) between vehicles 502, 504 to establish the highest bit rate with acceptable reliability supported by the receivers by slowing transmit speed incrementally upon failure to receive a positive response to a handshake preamble. The handshake preamble can include three "on" and "off" bits in sequence: "101010". If a computing device 115 in receiving vehicle 504 can reliably detect the sequence of three bit pairs, computing device 115 transmits an acknowledgement (ACK) message to computing device 115 of vehicle 502 by energizing IR LEDs to emit IR radiation 512, 514 at the same bit rate as was received.

If computing device 115 in vehicle 504 detects at least one bit pair, but cannot detect three discrete bit pairs in the received IR data, computing device 115 in vehicle 504 can transmit a negative acknowledgement (NAK) message to vehicle 502 via IR radiation 512, 514 at a bit rate that computing device 115 predicts can be reliably received. Upon reception of the NAK message, computing device 115 in vehicle 502 can determine the bit rate of the received message and retransmit the "101010" preamble to vehicle 504 at the new, slower bit rate. Vehicle 504 can respond with an ACK or NAK, if NAK, at increasingly slower speeds until a speed is reached that supports reliable communication and an ACK is received, or a lower limit is reached. In cases where a lower limit is reached and no ACK is received in return, computing device 115 in vehicle 502 can determine that communication via modulated IR radiation is not currently possible. Computing device 115 can set a flag to cause the computing device 115 to try to communicate with vehicle 504 again after a short delay.

Figure 6:
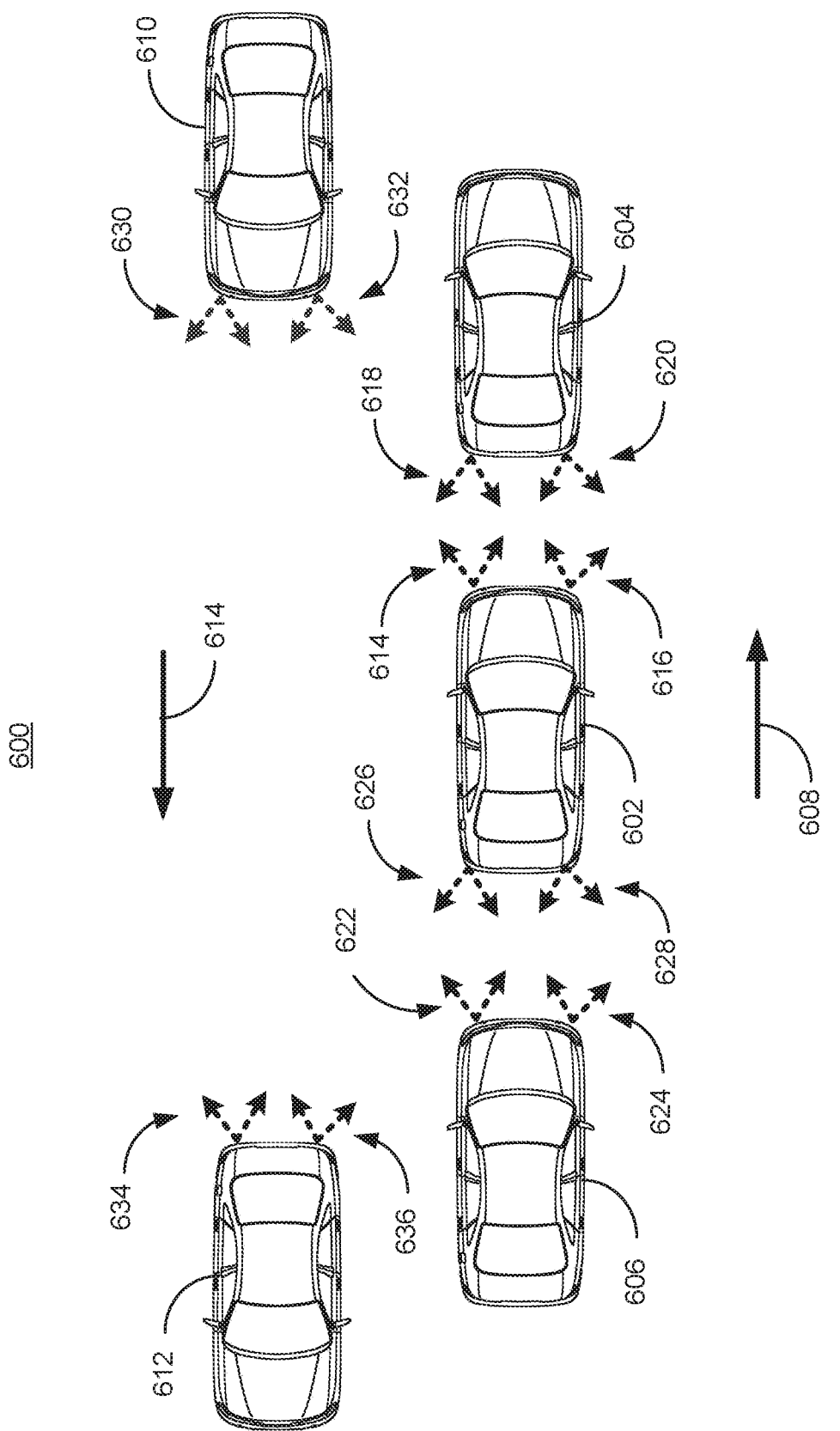
FIG. 6 is a diagram of an example traffic scene.

FIG. 6 is a diagram of a traffic scene 600, wherein vehicles 602, 604, 606 are traveling in the direction shown by arrow 608 and vehicles 610, 612 are traveling in the direction shown by the arrow 614. Vehicle 602 and vehicle 604 can transmit and receive BSMs via modulating IR radiation 614, 616, 618, 620, while vehicle 606 and vehicle 602 transmit and receive BSMs via modulating IR radiation 622, 624, 626, 628. Vehicle 602 can also transmit and receive BSMs to and from vehicles 610 by modulating IR radiation 614, 616, 630, 632 and vehicle 612 by modulating IR radiation 626, 628, 634, 636. Computing device 115 in vehicle 602 can determine multiple IR bits from multiple sources of IR radiation in a single IR video frame by forming multiple ROIs to track each source of IR radiation separately, for example.

In this case, vehicle 602 can negotiate communication speed with each of the other vehicles 604, 606, 610, 612. Vehicle 602 can select the slowest speed of the speeds negotiated with vehicles 604, 606, 610, 612 and communicate with all the vehicles 604, 606, 610, 612 at the slowest common speed. Computing device 115 in vehicle 602 can keep track of which vehicle 604, 606, 610, 612 was the slowest, and, when that vehicle 604, 606, 610, 612 leaves the ad hoc network formed by the vehicles 604, 606, 610, 612 nearby vehicle 602, vehicle 602 can increase the speed of transmission to a faster common speed among the remaining vehicles 604, 606, 610, 612 by either re-negotiating transmission speeds as described above or switching to a previously determined value.

Figure 7:
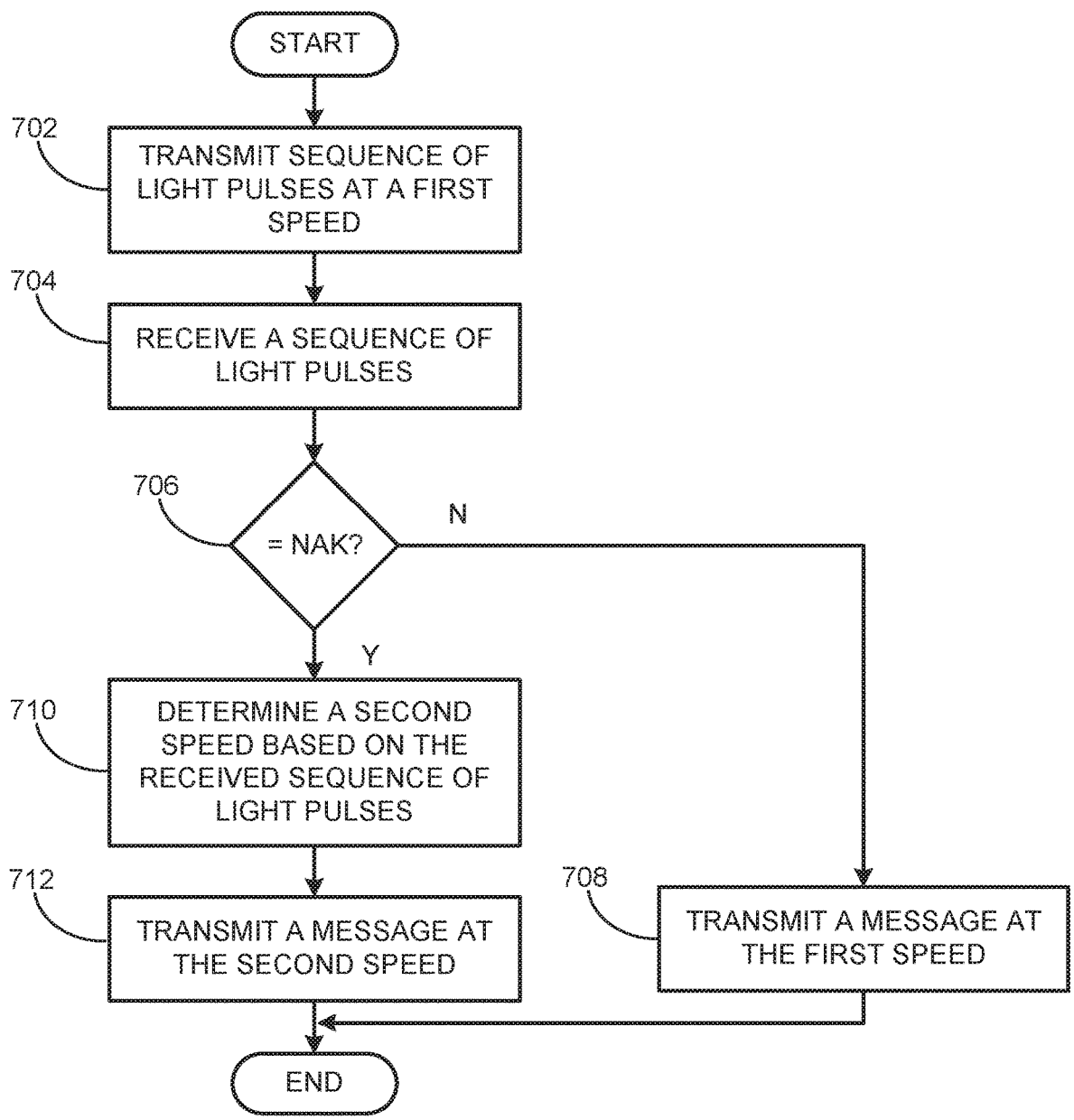
FIG. 7 is a flowchart diagram of an example process to modulate infrared lighting.

FIG. 7 is a diagram of a flowchart, described in relation to FIGS. 1-6, of a process 700 for transmitting a message, which can be a BSM, with modulated IR light pulses, e.g., as described above. Process 700 can be implemented by a processor of computing device 115, taking as input information from sensors 116, and executing instructions and sending control signals via controllers 112, 113, 114, for example. Process 700 includes multiple steps taken in the disclosed order. Process 700 also includes implementations including fewer steps or can include the steps taken in different orders.

Process 700 begins at step 702 wherein a computing device 115 in a vehicle 502 energizes IR LEDs to emit a sequence of light pulses or modulated IR radiation 508, 510. The sequence of light pulses is a sequence of bit pairs "101010" as a preamble as described above in relation to FIG. 5. This preamble can be received by a computing device 115 in vehicle 504 as a digital message via an IR video sensor as described above in relation to FIGS. 2-4. Computing device 115 in vehicle 504 can determine if the preamble was received correctly. If the preamble was received correctly, computing device 115 in vehicle 504 can energize IR LEDs to emit a sequence of light pulses or modulated IR radiation 512, 514 and thereby respond with an ACK message. If the preamble was not received correctly, for example, because of optical and environmental factors, computing device 115 in vehicle 504 can energize IR LEDs to emit a sequence of light pulses or modulated IR radiation 512, 514 representing a NAK message, as discussed above in relation to FIG. 5.

At step 704, computing device 115 in vehicle 502 receives a digital message from computing device 115 in vehicle 504 via an IR video sensor as described above in relation to FIGS. 2-4. At step 706, computing device 115 can determine if the message included a NAK. If the message did not include a NAK, the branch is taken to step 708, where a message can be transmitted from computing device 115 in vehicle 502 to computing device 115 in vehicle 504 via a sequence of light pulses or IR radiation 508, 510 at the first speed.

In the case where the message includes a NAK, a branch is taken to step 710, where computing device 115 in vehicle 502 can determine a second, slower bit rate or speed at which to communicate with vehicle 504. The slower bit rate can be an incremental decrease in transmission speed caused by increasing PWM length. The slower bit rate can be determined by analyzing the bit rate of the NAK as received at computing device 115. Computing device 115 in vehicle 504 can energize IR LEDs to emit modulated IR radiation 512, 514 at a bit rate predicted by computing device 115 in vehicle 504 to provide reliable communication between vehicle 502 and vehicle 504 as discussed above in relation to FIG. 4.

At step 712, computing device 115 in vehicle 502 can transmit a message to computing device 115 in vehicle 504 via modulated IR radiation 508, 510 at the second, slower bit rate or speed. This message can be a second preamble of three bit pairs to test the second, slower bit rate or computing device 115 determine that computing device 115 in vehicle 504 correctly predicted a reliable transmission speed and use that slower bit rate or speed. In this case, computing device 115 in vehicle 502 can transmit a message, which can be a BSM to vehicle 504 at the second, slower bit rate without transmitting a second preamble, after which process 700 ends.

In summary, process 700 describes a process wherein computing device 115 transmits a sequence of light pulses at a first speed, receives a sequence of light pulses, determines a second speed based on the received sequence of light pulses, and transmits a message, which can be a BSM, at the second speed.

Figure 8:
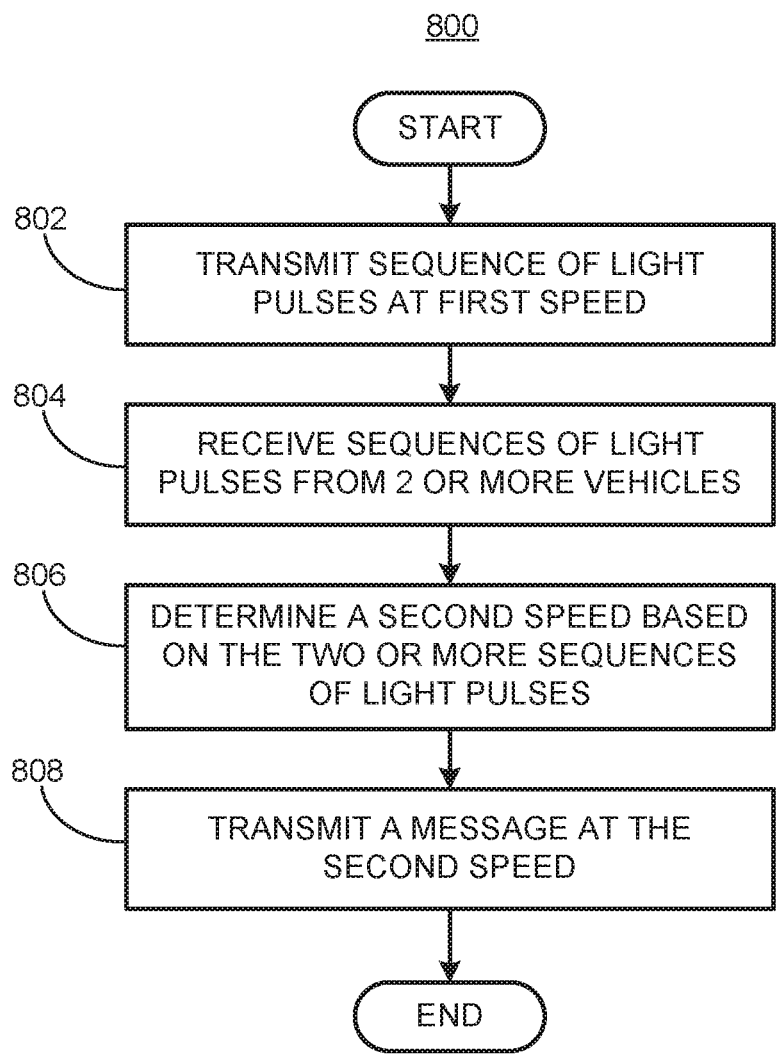
FIG. 8 is a flowchart diagram of an example process to modulate infrared lighting.

FIG. 8 is a diagram of a flowchart, described in relation to FIGS. 1-7, of a process 800 for transmitting a message, which can be a BSM, at a second speed, e.g., as described above. Process 800 can be implemented by a processor of computing device 115, taking as input information from sensors 116, and executing instructions and sending control signals via controllers 112, 113, 114, for example. Process 800 includes multiple steps taken in the disclosed order. Process 800 also includes implementations including fewer steps or can include the steps taken in different orders.

Process 800 begins at step 802, where a computing device 115 in a vehicle 602 energizes IR LEDs to emit IR radiation 614, 616, 626, 628 to transmit a sequence of light pulses at a first speed. These light pulses can be received by computing devices 115 in vehicles 604, 606, 610, 612. Computing devices 115 in vehicles 604, 606, 610, 612 can determine if a slower bit rate is required for reliable communications and transmit a NAK message at that bit rate by energizing IR LEDs to emit IR radiation 618, 620, 622, 624, 630, 632, 634, 636 to transmit sequences of light pulses. At step 804 computing device 115 in vehicle 602 receives the sequences of light pulses as a digital messages via IR video sensors.

At step 806, computing device 115 in vehicle 602 determines which speed, of the speeds of the sequences of light pulses received, is the slowest speed. At step 808 computing device 115 in vehicle 602 transmits a message, which can be a BSM, by energizing IR LEDs to emit IR radiation 614, 616, 626, 628 to transmit a sequence of light pulses at a second speed, where the second speed is equal to the slowest speed determined in step 806.

In summary, process 800 is a process for transmitting a sequence of light pulses at a first speed, receiving sequences of light pulses from two or more vehicles, determining a second speed based on the two or more sequences of light pulses where the second speed is the slowest speed and transmitting a message at the second speed to the two or more vehicles.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
transmitting a sequence of light pulses having a first speed;
receiving a second sequence of light pulses from a vehicle; and
transmitting a message as a sequence of light pulses having a second speed based on the second sequence of light pulses received from the vehicle and selected at least in part to be different from the first speed.

2. The method of claim 1, wherein a computing device determines the second speed based on the second sequence of light pulses received from the vehicle that is slower than the first speed.

3. The method of claim 2, wherein the computing device determines when the vehicle is no longer in proximity and transmits a sequence of light pulses having a third speed, wherein the third speed is faster than the second speed.

4. The method of claim 3, wherein the computing device receives a third sequence of light pulses from a third vehicle and transmits the message as a sequence of light pulses having a third speed based on the third sequence of light pulses received from the vehicle, wherein the third speed is different from the second speed.

5. The method of claim 1, wherein the light pulses are modulated IR radiation.

6. The method of claim 1, wherein the message includes information regarding vehicle position, motion, size, safety events, path history and vehicle status, encoded into light pulses as binary bits, wherein the encoding is independent of message transmission speed.

7. The method of claim 6, wherein the message is also transmitted via a wireless vehicle-to-vehicle network.

8. The method of claim 1, wherein the sequences of light pulses are received via an IR video sensor.

9. The method of claim 1, wherein the sequences of light pulses are received from two or more vehicles.

10. The method of claim 9, further comprising:
emitting the message as a sequence of light pulses having a fourth speed based on the sequences of light pulses, wherein the fourth speed is set equal to the slowest of the sequences of light pulses.

11. An apparatus, comprising:
a processor;
a memory, the memory storing instructions executable by the processor to:
transmit a sequence of light pulses having a first speed;
receive a second sequence of light pulses from a vehicle; and
transmit a message as a sequence of light pulses having a second speed based on the second sequence of light pulses received from the vehicle and selected at least in part to be different from the first speed.

12. The apparatus of claim 11, wherein a computing device determines the second speed based on the second sequence of light pulses received from the vehicle that is slower than the first speed.

13. The apparatus of claim 12, wherein the computing device determines when the vehicle is no longer in proximity and transmits a sequence of light pulses having a third speed, wherein the third speed is faster than the second speed.

14. The apparatus of claim 13, wherein the computing device receives a third sequence of light pulses from a third vehicle and transmits the message as a sequence of light pulses having a third speed based on the third sequence of light pulses received from the vehicle, wherein the third speed is different from the second speed.

15. The apparatus of claim 11, wherein the light pulses are modulated IR radiation.

16. The apparatus of claim 11, wherein the message includes information regarding vehicle position, motion, size, safety events, path history and vehicle status, encoded into light pulses as binary bits, wherein the encoding is independent of message transmission speed.

17. The apparatus of claim 16, wherein the message is also transmitted via a wireless vehicle-to-vehicle network.

18. The apparatus of claim 11, wherein the sequences of light pulses are received via an IR video sensor.

19. The apparatus of claim 11, wherein the sequences of light pulse are received from one or more vehicles.

20. The apparatus of claim 19, further comprising:
emitting the message as a sequence of light pulses having a fourth speed based on the sequences of light pulses, wherein the fourth speed is set equal to the slowest of the sequences of light pulses.

\* \* \* \* \*